(12) United States Patent
Peterson (10) Patent No.: US 6,372,382 B2
(45) Date of Patent: *Apr. 16, 2002

(54) LOW PROFILE FRONT TERMINAL LEAD-ACID BATTERY

(75) Inventor: Steven R. Peterson, Minneapolis, MN (US)

(73) Assignee: GNB Technologies, Inc., Alpharetta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,330

(22) Filed: Aug. 21, 1999

(51) Int. Cl.$^7$ .................................................. H01M 2/02
(52) U.S. Cl. ........................ 429/179; 429/176; 429/177; 429/149; 429/57; 429/160
(58) Field of Search .................................. 429/177, 176, 429/175, 163, 178, 179, 180, 181, 185, 65, 53, 57, 90, 82, 85, 149, 151, 160, 211

(56) References Cited

U.S. PATENT DOCUMENTS

| | | | |
|---|---|---|---|
| 1,508,926 A | 9/1924 | Cook | |
| 3,767,467 A | 10/1973 | Miller et al. | |
| 3,883,369 A | 5/1975 | Badger et al. | 136/176 |
| 4,278,742 A | 7/1981 | Oxenreider et al. | 429/88 |
| 4,331,747 A * | 5/1982 | Julian et al. | 429/160 |
| 4,444,853 A * | 4/1984 | Halsall et al. | 429/54 |
| 4,645,725 A | 2/1987 | Kump et al. | 429/179 |
| 4,693,949 A | 9/1987 | Kellett et al. | |
| 4,724,190 A | 2/1988 | Siga et al. | |
| 4,883,728 A * | 11/1989 | Witehira | 429/160 |
| 5,162,164 A * | 11/1992 | Dougherty et al. | 429/9 |
| 5,169,735 A * | 12/1992 | Witehira | 429/160 |
| 5,181,936 A | 1/1993 | Meadows | 29/623.2 |
| 5,197,994 A | 3/1993 | Brocksmith | 29/623.2 |
| 5,223,351 A * | 6/1993 | Wruck | 429/9 |
| 5,686,202 A * | 11/1997 | Hooke et al. | 429/160 |

* cited by examiner

Primary Examiner—Gabrielle Brouillette
Assistant Examiner—Raymond Alejandro
(74) Attorney, Agent, or Firm—Leydig, Voit & Mayer, Ltd.

(57) ABSTRACT

A lead-acid battery, which achieves a low profile while allowing grids of relative maximum height to be used, comprises a container having the terminal cells located adjacent the front of the battery so as to allow ready access to the battery when located in racks or the like in service, and a cover, preferably a two-piece cover, containing the terminals, interior surfaces of the cover and top surfaces of the container being sloped upwardly in a rearward direction from the front of the battery, thereby allowing the use of relatively tall grids.

9 Claims, 7 Drawing Sheets

LOW PROFILE FRONT TERMINAL LEAD-ACID BATTERY

FIELD OF THE INVENTION

This invention relates to lead-acid batteries and, more particularly, to a low profile lead-acid battery having front terminals.

BACKGROUND OF THE INVENTION

Lead-acid batteries have long been in use for a wide variety of applications. For example, such cells and batteries have been used for what have sometimes been termed "stationary" battery applications wherein the lead-acid batteries provide stand-by power in the event of a power failure. For this type of application, such stationary batteries are maintained at a full-state-of-charge and in a ready-to-use condition, typically by float maintenance charging at a constant preset voltage. By way of illustration, such stationary batteries may be used in telecommunications, utilities and the like.

In many applications, the space allotted for the battery is limited, yet there is a need for batteries having increased electrical capacity. For example, in some stationary applications, the batteries are placed upon racks. Utilizing batteries having top terminals require more battery space since clearance needs to be provided above the batteries so the installer can reach in above the batteries and make the appropriate electrical connections. Utilizing shelves that slide out may reduce some of the clearance required but add additional cost for the rack structure required.

Even further, as is known, current lead-acid battery designs create restrictions on the height of the grids utilized. Thus, in general, and as is known, the grid height that may be utilized is limited by the requirements involved in sealing (typically, heat sealing) of the cover to the battery container and in providing appropriate internal electrical connections.

Thus, there is a need for a lead-acid battery having terminals located such that they can be accessed from the front of a battery rack or the like. Further, there is a need for such lead-acid batteries having enhanced electrical performance without requiring undesirably tall batteries, i.e., a low profile battery. Yet, such batteries must be capable of being assembled without requiring undue modification of conventionally used lead-acid battery assembly processes and equipment.

Accordingly, it is an object of the present invention to provide a low profile battery having enhanced electrical performance.

Another object of this invention is to provide a lead-acid battery having front terminals so as to facilitate access when such batteries are located in use in battery racks or the like.

A still further object lies in the provision of such low profile, front terminal batteries which are capable of being fabricated using existing lead-acid battery assembly techniques.

Other objects and advantages of the present invention can be seen from the following description of the invention.

BRIEF SUMMARY OF THE INVENTION

In general, the present invention comprises a lead-acid battery wherein the container utilized is divided by intercell partitions to provide the desired cell configuration. A low profile battery is achieved by utilizing a container wherein the appropriate walls and partitions of the container possess an upwardly sloping surface in a rearward direction from the front of the battery. The battery terminals are contained in a cover configured with upwardly sloping container surfaces and is sealed to the container.

In this fashion, the desired heat sealing or the like of the cover to the container can be accomplished, while allowing the use of taller grids, yet still accommodating the cell height necessary to achieve the intercell welds required. Other features of the present invention will be apparent from the following description.

DESCRIPTION OF THE PREFERRED EMBODIMENTS

Figure 1:
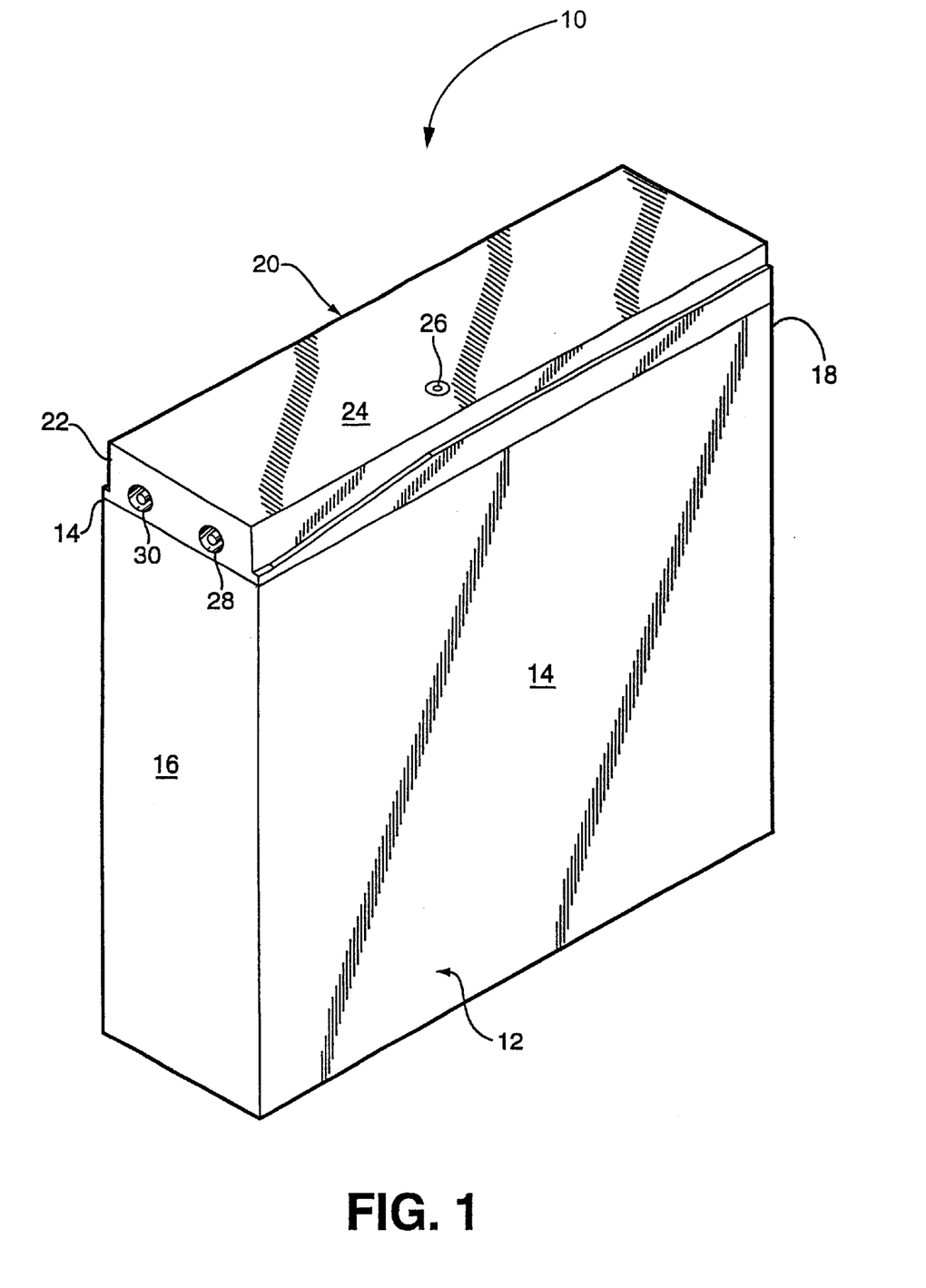
FIG. 1 is a perspective view of a preferred embodiment of a 12-volt battery according to the present invention.

As is shown in FIG. 1, the 12-volt lead-acid battery 10 comprises a container 12 having side walls 14, a front wall 16, and a back wall 18. The composite cover shown generally at 20 comprises an intermediate cover shown generally at 22 sealed or otherwise attached to container 12, and a final cover 24 sealed to intermediate cover 22. The battery 10, according to the preferred embodiment, includes a flame arrestor shown at 26.

According to one aspect of the present invention, the positive terminal 28 and the negative terminal 30 are positioned at the front of the battery 10. In this fashion, when placed upon a battery rack or the like, the positive and negative terminals 28 and 30 can be readily accessed, as is needed in service.

Figure 2:
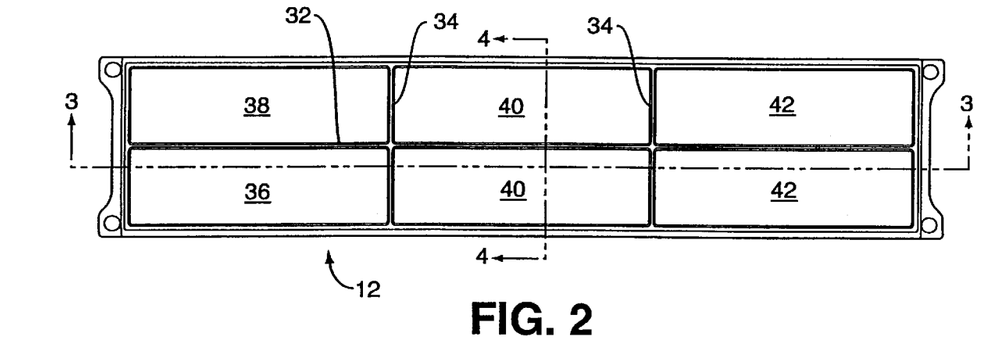
FIG. 2 is a top view of a container used in the battery of the present invention.

The container 12, as best seen in FIG. 2, includes a central partition 32 and cross-partitions 34 dividing the container into six cells in a 2×3 cell configuration. Front positive and negative terminals cells, 36 and 38, respectively, are thus provided, as are central cells 40 and back cells 42. The terminal cells are thus defined by the interior surface of side and front walls 14 and 16, and by central partition 32, and the first cross-partition 34 (i.e., the cross-partition located closest to front wall 16). Central cells 40 are defined by the central, first and second cross-partitions, 32 and 34, respectively, and by side wall 14. Lastly, back cells 42 are defined by the interior surface of side and back walls, 14 and 18, respectively, and by central partition 32, and second partition 34. The size of the cells can be varied as desired to satisfy the space and electrical performance requirements of the particular application.

Figure 3:
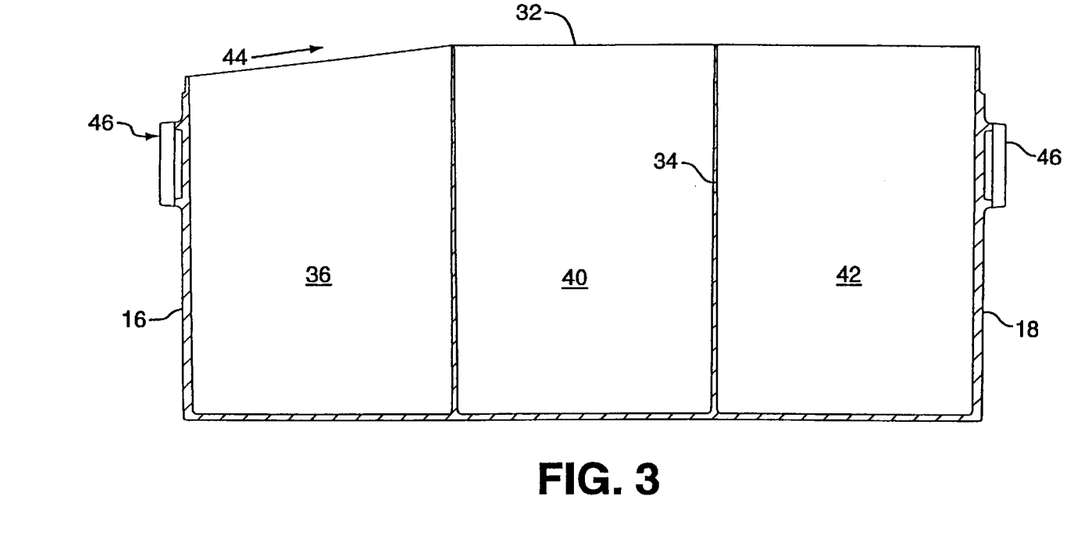
FIG. 3 is a cross-sectional view taken generally along line 3—3 of FIG. 2 and showing the sloping container wall in the terminal cells.
Figure 4:
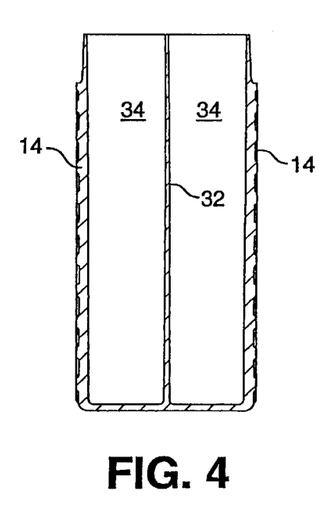
FIG. 4 is a cross-sectional view taken generally along line 4—4 of FIG. 2 and showing the side-by-side location of the cells.
Figure 5:
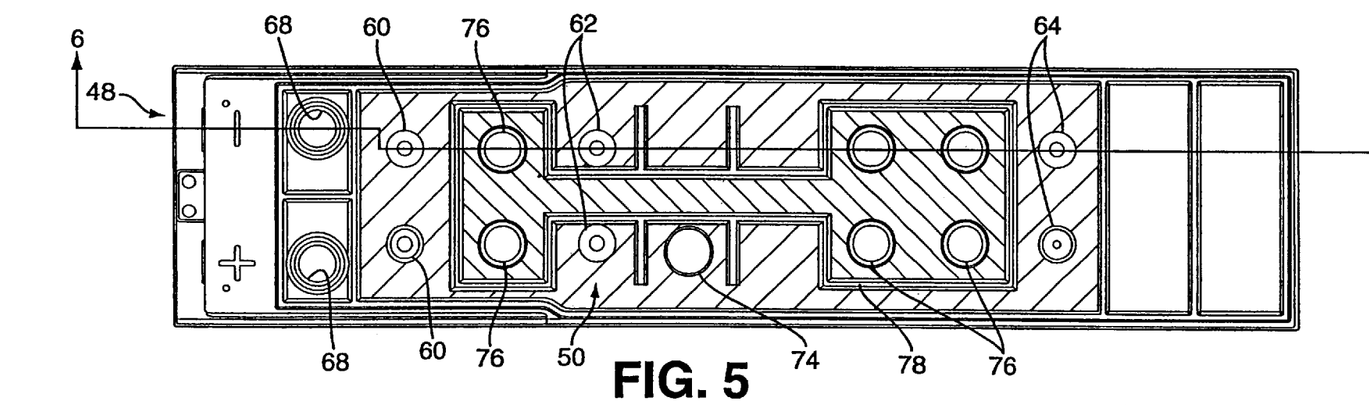
FIG. 5 is a top view of an intermediate cover used in the battery of the present invention.

Pursuant to another and important aspect of the present invention (as best seen in FIG. 3), a container structure is provided which achieves a low profile battery allowing the use of grids having a maximum height. To this end, the center partition 32 has its top surface sloping upwardly in a rearward direction as shown by arrow 44, reaching the full height of the container at the first cross-partition 34. The top of the container side walls 14 are similarly sloped upwardly, complemental with the slope of center partition 32. In this fashion, as will be seen hereinafter, the overall height of the battery can be minimized while still allowing grids of a maximum height.

An optional feature includes structure allowing the battery to be lifted, whether by hand or other means. As is shown in FIG. 3, container 12 is provided with holes 46 located on front wall 16 and back wall 18 so as to accommodate a rope or other handle (not shown).

Figure 8:
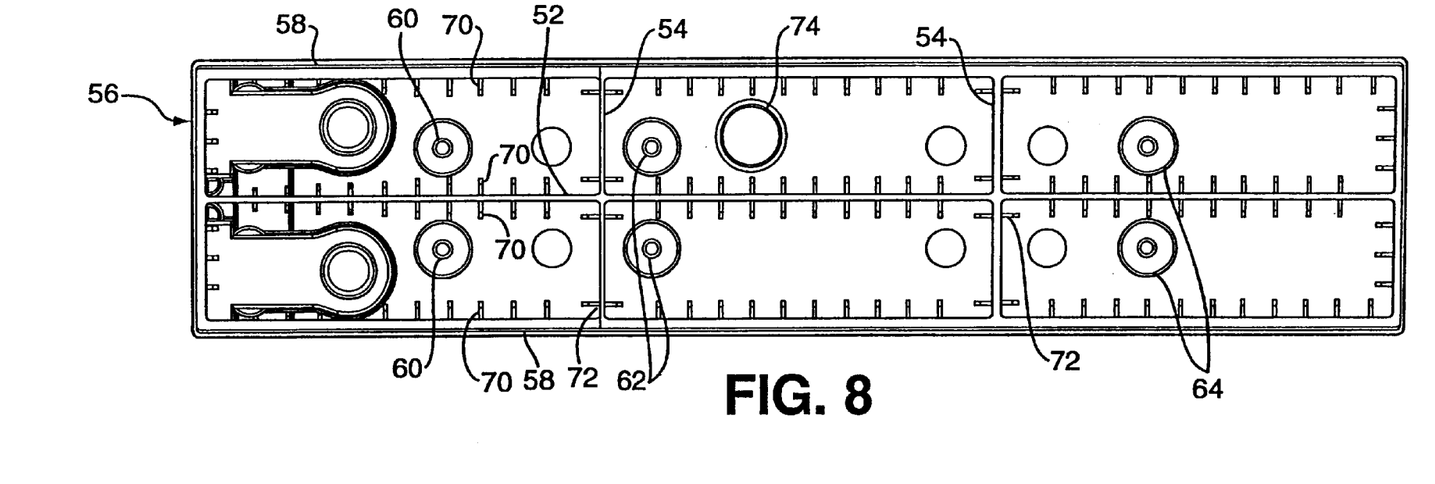
FIG. 8 is a bottom view of the intermediate cover and illustrating the respective positioning of the alignment guides and complementally figured sloped surfaces for sealing to the respective sloped container surfaces.

In accordance with yet another aspect of the present invention, a low profile battery is achieved by utilizing a cover housing the front terminals and configured compatibly with the sloped surfaces of the battery container so as to allow the appropriate intercell connections to be made while utilizing optimally-sized grids. The illustrative embodiment utilizes a two-piece cover, an intermediate cover and a front cover. As shown in FIGS. 5–8, an intermediate cover 48 is provided, configured complementally with container 12 so as to allow the use of conventional heat sealing equipment to seal these components together. The intermediate cover 48 includes a base structure shown generally at 50 divided by intermediate cover center partition 52 configured to align with partitions 32 and 34 of the container 12 and complementally shaped so as to allow the respective surfaces of the partitions to be heat sealed together. Thus, as can best be seen in FIGS. 6 and 7, the intermediate central partition 52 slopes upwardly in a rearward direction from front face 56 up to first intermediate cover cross-partition side walls 54 (FIG. 8). Side walls 58 likewise slope upwardly in a rearward direction so as to allow sealing to the upwardly sloping tops of side walls 14 of the container 12.

Access to the individual positive and negative terminal cells 36 and 38 are provided by fill holes 60. Fill holes 62 provide access to central cells 40, and access to back cells 42 is provided through fill holes 64.

Figure 6:
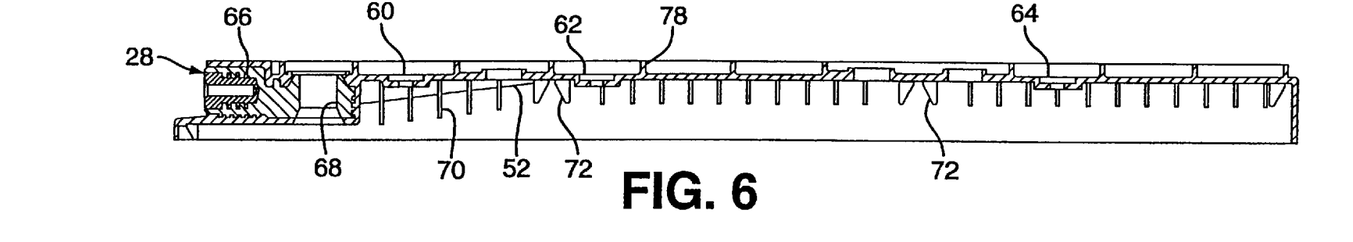
FIG. 6 is a cross-sectional view of the intermediate cover of FIG. 5 and showing the positioning of a front terminal.
Figure 7:
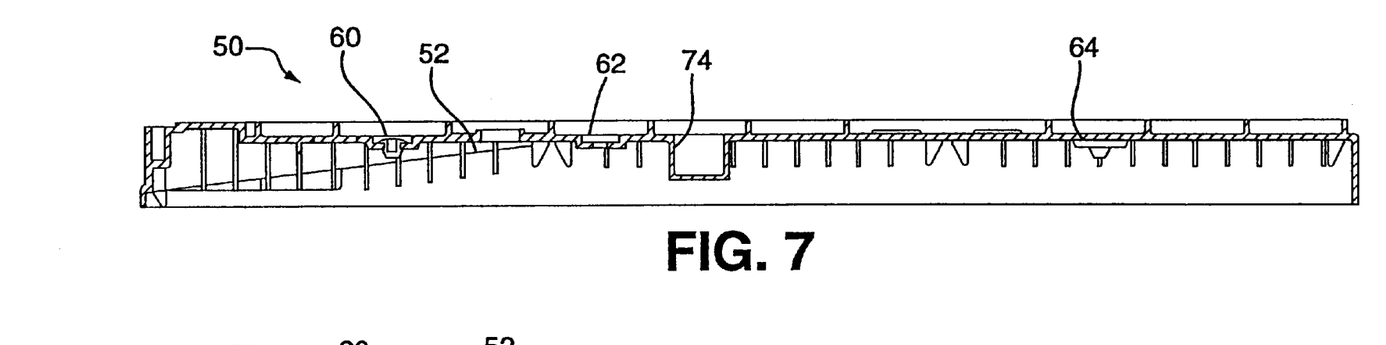
FIG. 7 is another cross-sectional view of the intermediate cover and showing a well for a flame arrestor.

The intermediate cover houses not only the terminals (see positive terminal 28, FIG. 6), but also contains structure allowing appropriate electrical connection to such terminals. Thus, as best seen in FIG. 6, positive terminal 28 is contained in bushing 66 having opening 68 accommodating a post electrically connecting the plates in positive and negative terminal cells 36 and 38 to positive and negative terminals 28 and 30.

It should be appreciated that the particular configuration of the terminals themselves can be varied as needed for the service requirements of the particular application. Internally threaded configurations, as are illustrated, are often employed in stationary applications where several batteries need to be electrically connected together. Further, while the embodiment shown has front terminals located adjacent the front wall 16 of the battery, it should be appreciated that top terminals, either alone or as dual terminals with the front terminals as illustrated. Indeed, if desired, the terminals, either alone or as a dual terminal configuration, could be located as side terminals adjacent the front of side walls 14. In any event, the terminals employed are located at least near the front wall 16 so as to allow ready access in service.

Further, the manner and structure which is utilized to make the electrical connections can vary as desired, consistent with the objectives of this invention. Thus, what is most important is that the terminals are accessible from the front of the battery and are located so as to minimize the profile of the battery.

Optionally, and desirably, intermediate cover 48 likewise includes guide pins 70 (FIGS. 6–8), preferably positioned both adjacent intermediate cover side walls 58 and central partition 52 so as to facilitate assembly. Guides span intermediate cover cross-partitions 54, thus allowing alignment and appropriate heat sealing by conventional means. Any desired configuration of guide pins 70 and guides 72 can be used. Further optional features include a well 74 for a flash arrestor.

Additionally, the preferred embodiment of the intermediate cover is designed to provide common head space for the cells and also to allow for pressure testing to ensure that appropriate sealing has been provided. As can be seen from FIGS. 5–7, common head space is provided via apertures 76 and upstanding structure 78.

Figure 9:
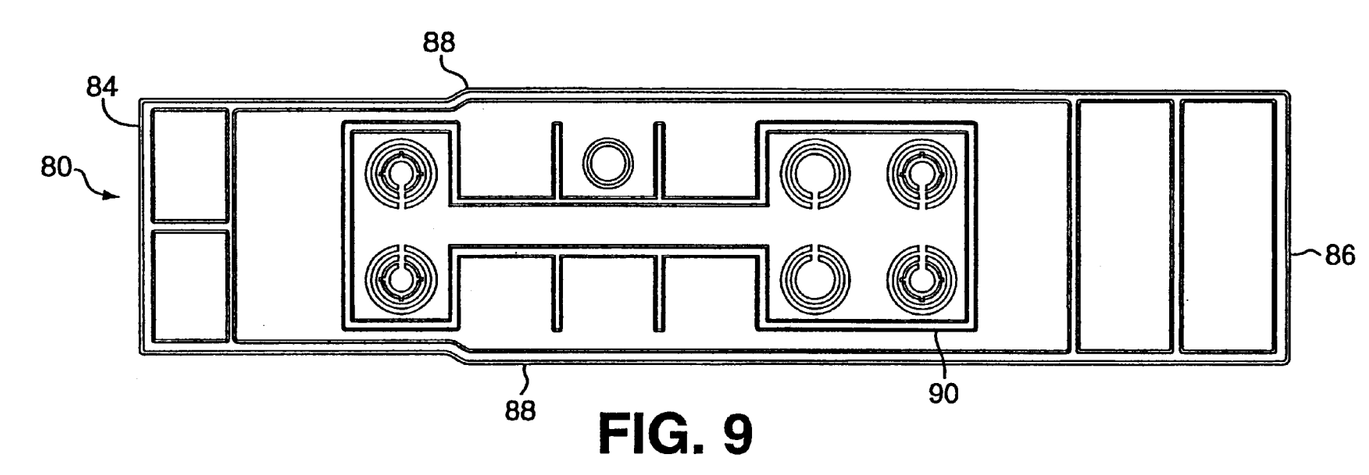
FIG. 9 is a bottom view of the final cover according to the preferred embodiment of the present invention.
Figure 10:
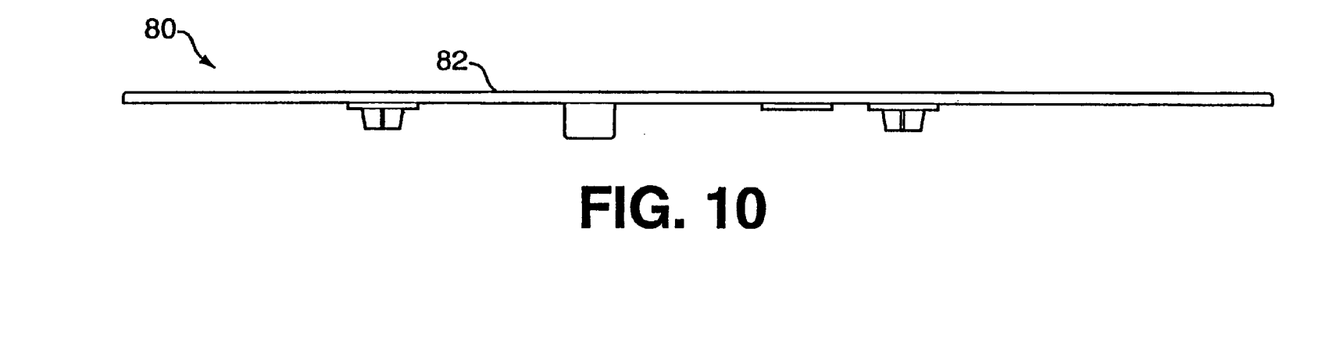
FIG. 10 is a side view of the final cover.
Figure 11:
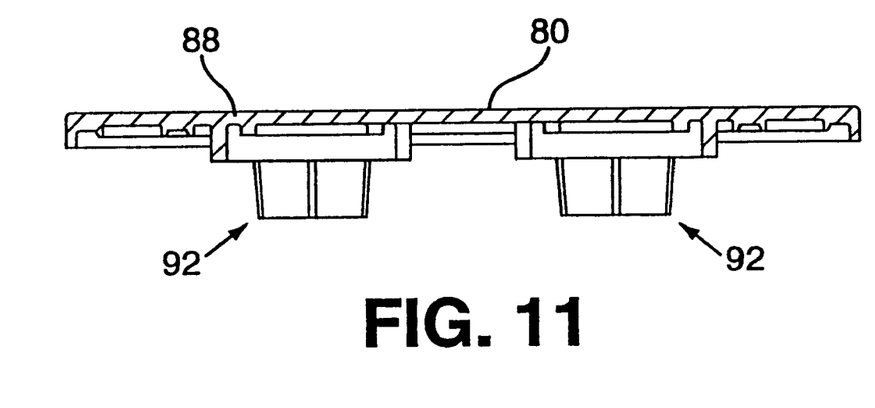
FIG. 11 is a partial cross-sectional view looking from the end of the final cover and showing the vents.
Figure 12:
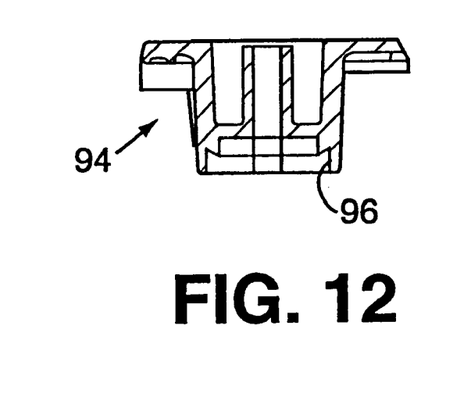
FIG. 12 is a detailed view and showing the vent arrestor details.

FIGS. 9–12 illustrate a preferred embodiment for the final cover 80 (FIGS. 9–10). Thus, this cover piece comprises a final cover base 82 complementally shaped so as to fit upon intermediate cover 48. Final cover 80 accordingly includes a front sealing surface 84 (FIG. 9), a rear cell sealing surface 86 and side surfaces 88 all complementally sized with respect to intermediate cover 48. Final cover 80 likewise includes structure compatibly shaped and positioned with regard to apertures 76 and pressure testing structure 78 of the intermediate cover 48 to allow appropriate pressure testing and common head space. Final cover structure 90 thus is configured complementally with structure 78 of intermediate cover 48 so as to allow for the common head space. Appropriate venting into such common head space can be achieved through vents 92 configured as can be seen in FIGS. 10–11.

Optional flame arrestor structure 94 can be used (FIG. 12), when desired. As is known, a disk can be set into area 96 to provide the flame arresting function. Suitable disks are available and may be utilized.

Figure 13:
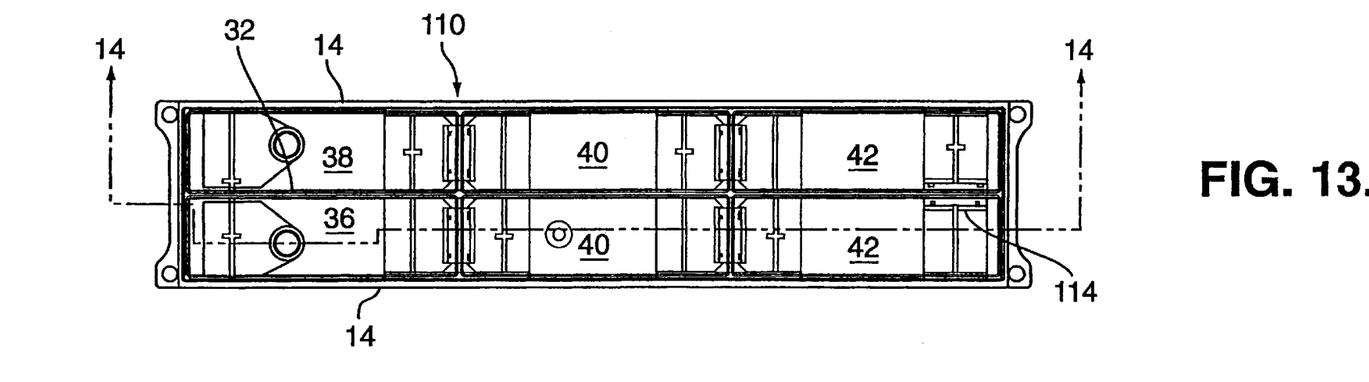
FIG. 13 is a top assembly view of the container showing the cell elements in place and the intercell welds.
Figure 14:
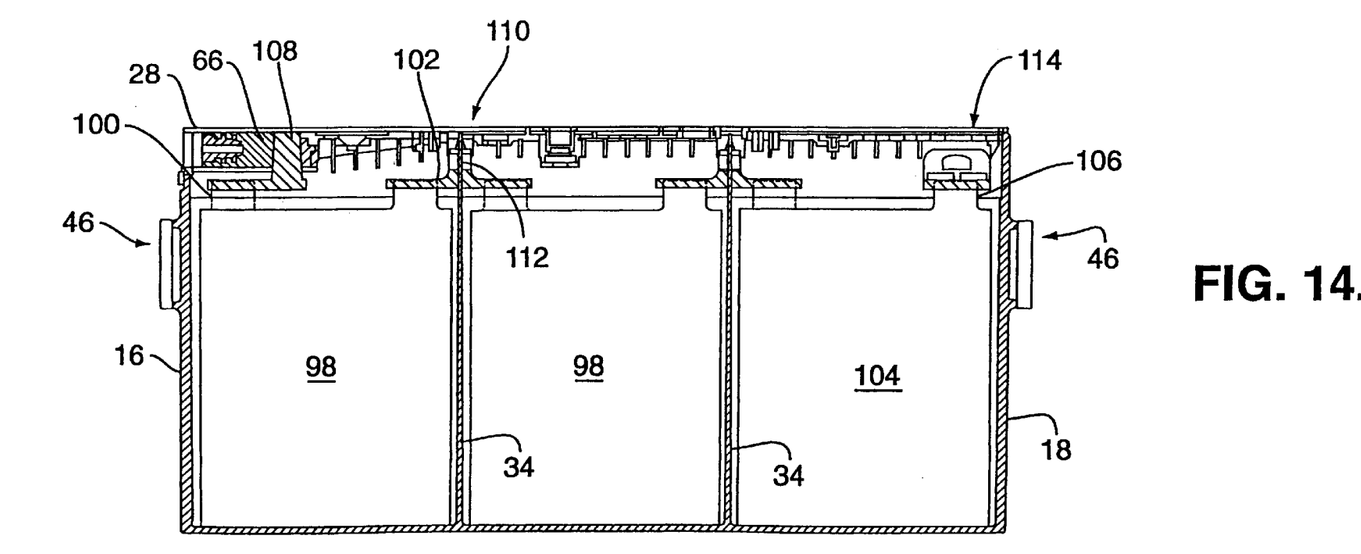
FIG. 14 is a cross-sectional view taken generally along line 14—14 of FIG. 13 and further illustrating the internal electrical connections.

FIGS. 13 and 14 show one embodiment of a battery of this invention with the cell components in place. Each of the six cells have a battery element comprising a series of alternately disposed positive and negative plates having separators positioned therebetween. The particular configuration and the number of plates and the respective size can be varied as desired for the particular application. The present invention can be used whether the lead-acid battery is of the flooded electrolyte or sealed type (i.e., a VRLA or valve-regulated lead-acid). Suitable grids and alloys are known and may be used, as are appropriate separator materials. Still further, appropriate strap alloys and intercell weld techniques are known and may be employed.

As shown, positive terminal cell 36 (FIG. 14) includes positive plates 98 having lugs 100 electrically connected together by strap 102. Negative plates 104 similarly have lugs 106.

Electrical connection to the terminals can be accomplished as desired. In the illustrative embodiment (FIG. 14), a post 108 is provided and is electrically contacted to bushing 66. Appropriate post formation techniques are known and may be utilized, as desired.

The preferred embodiment likewise includes intercell connections so as to electrically connect the plates of appropriate polarity together from cell-to-cell, as is also known. As can be thus seen in FIGS. 13–14, intercell welds 110 connect terminal cells 36 and 38 with the appropriate center cells 40 and back cells 42, via conventional tombstones 112.

As shown, back cells are electrically connected via a crossover intercell weld shown by arrow 114.

As has thus been seen, the features of the present invention combine to provide a low profile battery having the terminals capable of being accessed from the front. Using the sloped heat seal approach in the terminal cells and locating the terminals in the cover allows, for a particular selected height for the battery, the use of grids and plates which can have an increased height, so as to achieve enhanced electrical performance, relative to the use of conventional lead-acid battery containers and different terminal locations. As can be thus seen in FIG. 14, and as may be appreciated in this field, the height of the plates 98 and 104 that may be used will be restricted by the location of the terminals and the need to heat seal the cover to the container while still having a height for the battery container adequate to allow appropriate intercell connections. The present invention, by using a sloped container and cover with the position of the terminals in the cover, combine to minimize the head space required in the terminal cells while still accommodating the container height needed for the appropriate intercell connections.

While the present invention has been shown having the illustrative embodiment for a 12-volt battery with a 2×3 cell configuration, it should be appreciated that the invention is susceptible to various modifications and alternative forms. It is not intended to limit the invention to the particular forms disclosed, but, on the contrary, the intention is to cover all modifications, equivalents and alternatives falling with the spirit and scope of the invention as expressed in the appended claims. For example, this invention could be utilized for a 6-volt battery (in which a 1×3 cell configuration would be preferably utilized, or a 12-volt battery with a configuration other than a 2×3 configuration, e.g., a 1×6 configuration). The illustrated 2×3 cell configuration is preferred since each of the "front cells" are terminal cells and the length of the battery-to-battery connections is shorter than with other cell configurations.

Indeed, the present invention may be utilized for any desired voltage and for any application where it is desired to utilize a cell or battery wherein taller plates are utilized, including for automotive applications. Similarly, while the preferred embodiment utilizes the front cells as the terminal cells, it should be appreciated that the advantages of using taller plates can be achieved when the terminals are located on the side and/or top of the battery. In such events, the terminals are located in the cover; and the container and cover slant upwardly from the container side wall which the side terminals are located. When top terminals are used, the slant is preferably upwardly from one side wall, but could be from the end wall(s) adjacent top terminal.

Thus, whatever the terminal configuration, the container wall and cover slopes are utilized in the terminal cells. This configuration allows the use of the taller plates, thereby achieving optimized capacity.

Further, while the illustrative embodiment shows the respective slope surfaces extending from the container front wall to the first cell partition (i.e., the first cross-partition in the illustrative embodiment), the extent of the slope can be more or less, if desired. However, the preferred embodiment achieves about as shallow a slope (the shallower, the better for ease in heat sealing) as is considered generally practical, as well as providing strength and durability of the resulting battery. Thus, when the slope extends past the cell partition, the heat sealing of the cover to the container is made more complex. If such a configuration is used, it will generally be desirable to utilize a discontinuous slop and provide some flat sealing surface for the container-cover heat seal.

Still further, the illustrative embodiment utilizes a composite, two-piece cover that is preferred due to molding, appearance and assembly considerations. However, it should be appreciated that the two pieces could be combined; and a unitary cover employed. In this event, to enhance the cosmetic appearance of the assembled battery, plugs over the terminal/post burn areas can be included, if desired, as is known. Such a unitary cover can likewise include, if desired, open electrolyte fill/vent holes and appropriate fill/vent covers, also as are known.

Additionally, the preferred embodiment comprises a VRLA lead-acid battery. The present invention may likewise be employed for other types of batteries. Thus, the present invention may be used with other immobilized electrolyte batteries, one example being lead-acid gel batteries, are known.

What is claimed is:

1. A 12-volt lead-acid low profile battery for connection with additional batteries to provide stand-by power in the event of a power failure and capable of being accessed from the front of a battery rack comprising a container having a front, side, and back walls and a central partition and a first and second cross-partition dividing said container into positive and negative terminal cells defined by said container front and side walls and said central and first cross-partitions, two center cells defined by said container side walls and said central, first and second partitions, and two back cells defined by said container side and back walls and said central and second cross-partitions, each cell containing an element comprising positive and negative plates and separators therebetween, said plates having a lug for electrically connecting said plates together, said cell elements being electrically connected together, said container side walls and central partition having an upper surface sloping upwardly from said container front wall toward said first cross-partition, an intermediate cover complementally configured with said container side walls and said central partition and sealed thereto, said intermediate cover having a cover front wall and a positive terminal electrically connected to said cell element in said positive terminal cell and a negative terminal electrically connected to said cell element in said negative terminal cell, said positive and negative terminals being located in said cover front wall of said intermediate cover adjacent said container front wall and positioned to provide access thereto from the front of the battery when located in a battery rack, said intermediate cover having electrolyte fill holes for access to said cells, and a final cover overlying said intermediate cover and sealed thereto.

2. The battery of claim 1 wherein the upwardly sloping upper surfaces of said container side walls and central partition terminate at said first cross-partition.

3. The battery of claim 1 wherein said container has attachment structure for a handle.

4. The battery of claim 1 wherein said intermediate cover has an interior surface sealed to said container side walls and said central partition, said interior surface having cover central and cross-partition surfaces aligning with the respective container central and cross-partitions and having alignment guides.

5. The battery of claim 1 wherein said intermediate cover has an upper surface having apertures and a pressure-testing structure providing a common head space for said cells and pressure testing of the container-intermediate cover seal.

6. A low profile battery for connection with additional batteries to provide stand-by power in the event of power failure and capable of being accessed from the front of a battery rack, said battery comprising a container having front and back walls, opposing side walls and a partition extending from said container front wall and dividing said container, into a plurality of cells including positive and negative terminal cells, each cell containing an element comprising positive and negative plates and separators therebetween, said plates having a lug for electrically connecting said plates together, said cell elements being electrically connected together, said container side walls and said partition having an upper surface sloping upwardly from said front wall and a cover for said container having sloped surfaces complementally configured with the sloped surfaces of the container to allow sealing thereto, said cover being sealed to said container, said cover having a cover front wall, a positive terminal electrically connected to said cell element in said positive terminal cell and a negative terminal electrically connected to said cell element in said negative terminal cell, said positive and negative terminals being located in said cover front wall adjacent said container front wall and capable of being accessed from the front of the battery when located in a battery rack.

7. A 12-volt low profile battery for connection with additional batteries to provide stand-by power in the event of a power failure and capable of being accessed from the front of a battery rack, comprising a container having a front, side, and back walls and a central partition and a first and second cross-partition dividing said container into positive and negative terminal cells defined by said container front and side walls and said central and first cross-partitions, two center cells defined by said container side walls and said central, first and second partitions, and two back cells defined by said container side and back walls and said central and second cross-partitions, each cell containing an element comprising positive and negative plates and separators therebetween, said plates having a lug for electrically connecting said plates together, said cell elements being electrically connected together, said container side walls and central partition having an upper surface sloping upwardly from said container front wall toward said first cross-partition, a cover complementally configured with said container side walls and said central partition and sealed thereto, said cover having a cover front wall, a positive terminal electrically connected to said cell element in said positive terminal cell and a negative terminal electrically connected to said cell element in said negative terminal cell, said positive and negative terminals being located in said cover front wall adjacent said container front wall and capable of being accessed from the front of the battery when located in a battery rack.

8. The battery of claim 7 wherein the upwardly sloping upper surfaces of said container side walls and central partition terminate at said first cross-partition.

9. The battery of claim 7 wherein said battery is a valve-regulated, lead-acid battery.

* * * * *